United States Patent
Weymouth

(10) Patent No.: US 7,296,694 B2
(45) Date of Patent: Nov. 20, 2007

(54) TOWER-TYPE GREASE REMOVAL APPARATUS FOR COMMERCIAL GREASE TRAP ASSEMBLIES

(76) Inventor: Bret M. Weymouth, 14325 NE. Tangen Rd., Newberg, OR (US) 97132

( * ) Notice: Subject to any disclaimer, the term of this patent is extended or adjusted under 35 U.S.C. 154(b) by 26 days.

(21) Appl. No.: 11/249,238

(22) Filed: Oct. 12, 2005

(65) Prior Publication Data
US 2006/0076289 A1    Apr. 13, 2006

Related U.S. Application Data

(60) Provisional application No. 60/617,812, filed on Oct. 12, 2004.

(51) Int. Cl.
*C02F 1/40* (2006.01)
(52) U.S. Cl. .................. 210/526; 210/540; 210/242.3
(58) Field of Classification Search ............ 210/242.3, 210/242.4, 400, 526, 540, 923, 924
See application file for complete search history.

(56) References Cited

U.S. PATENT DOCUMENTS

| | | | | |
|---|---|---|---|---|
| 3,508,663 A | * | 4/1970 | Brill | 210/400 |
| 3,695,451 A | * | 10/1972 | Schmidt et al. | 210/526 |
| 4,089,784 A | * | 5/1978 | Ettelt et al. | 210/526 |
| 4,268,396 A | | 5/1981 | Lowe | |
| 4,274,957 A | * | 6/1981 | Koller | 210/526 |
| 4,582,604 A | * | 4/1986 | Bashaw | 210/400 |
| 4,652,372 A | * | 3/1987 | Threadgill | 210/526 |
| 4,876,011 A | * | 10/1989 | Betts et al. | 210/526 |
| 5,062,953 A | * | 11/1991 | Lewan | 210/526 |
| 5,223,128 A | * | 6/1993 | Combrowski | 210/924 |
| 5,827,425 A | * | 10/1998 | McKinnon | 210/540 |
| 5,928,520 A | * | 7/1999 | Haumesser | 210/540 |
| 5,989,422 A | * | 11/1999 | Hobson | 210/400 |
| 6,878,270 B1 | | 4/2005 | Batten et al. | |

* cited by examiner

*Primary Examiner*—Christopher Upton
(74) *Attorney, Agent, or Firm*—Olson & Olson

(57) ABSTRACT

A grease skimming and removal apparatus for use with grease trap settling tank apparatus provides a vertically elongated, vertically extending tower housing on the top wall of a grease trap tank and provides a power driven, vertically elongated, vertically extending rotating skimmer belt loop arranged to skim and transport grease and oils from wastewater contained in the grease trap tank to a vertically-elevated position above the top wall of the settling tank for gravity discharged therefrom and into a collection vessel releasably secured to the tower housing above the top wall of the grease trap tank.

4 Claims, 5 Drawing Sheets

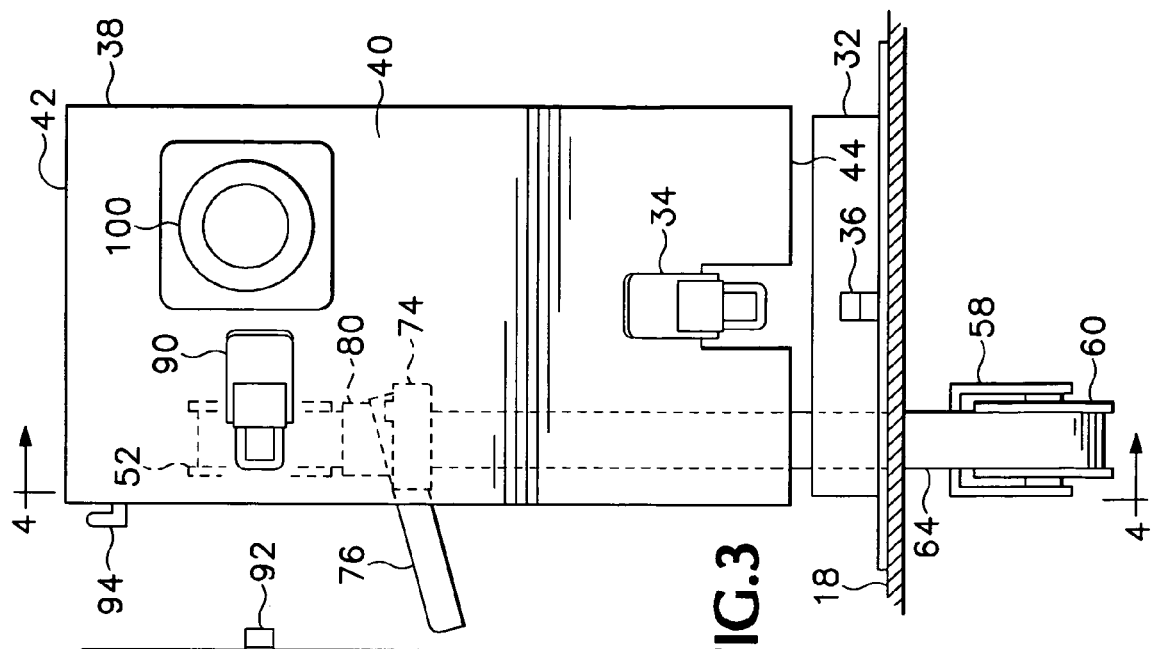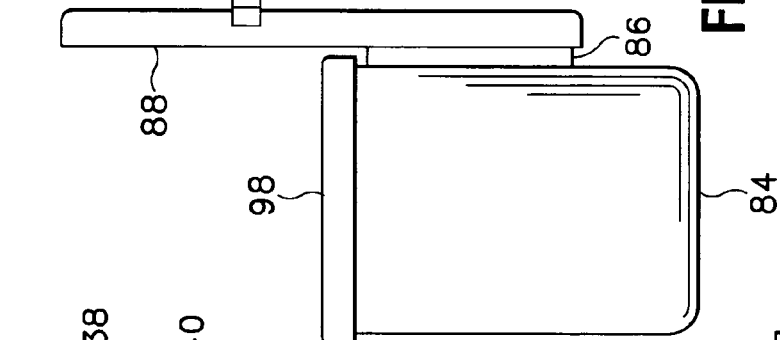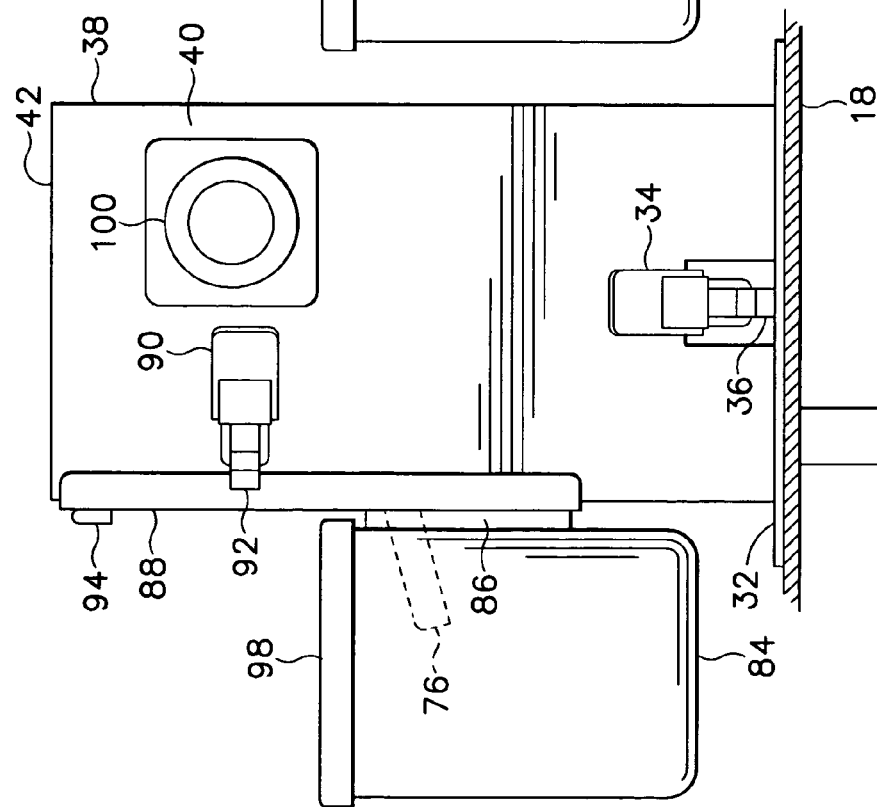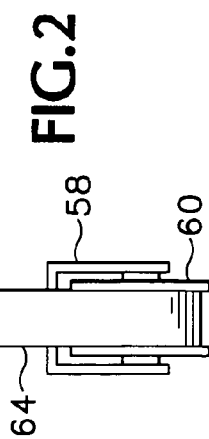

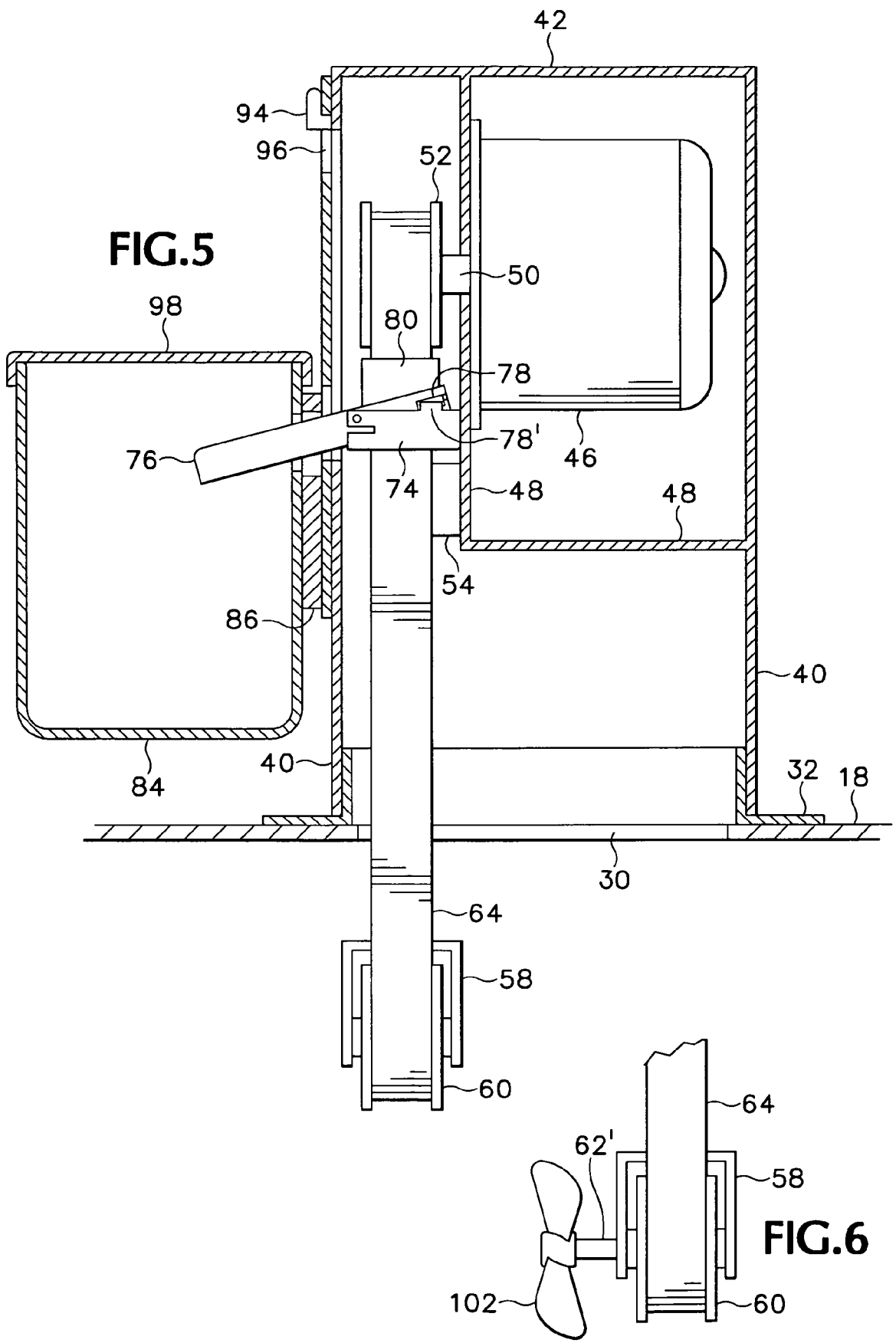

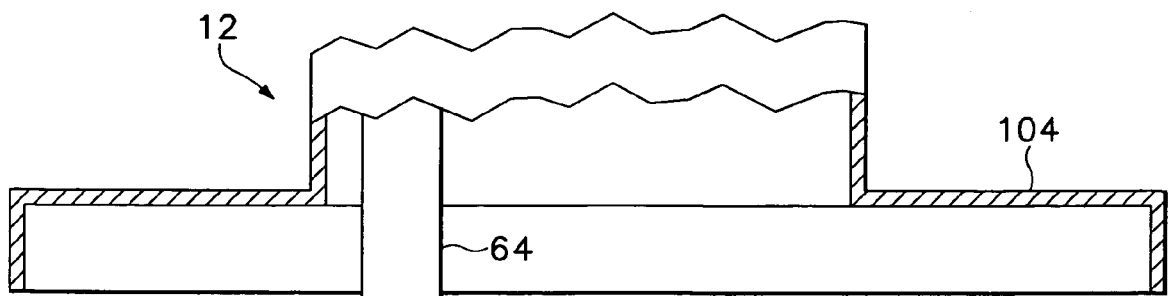
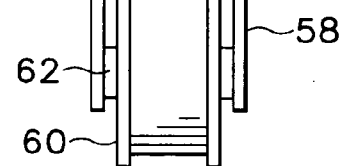
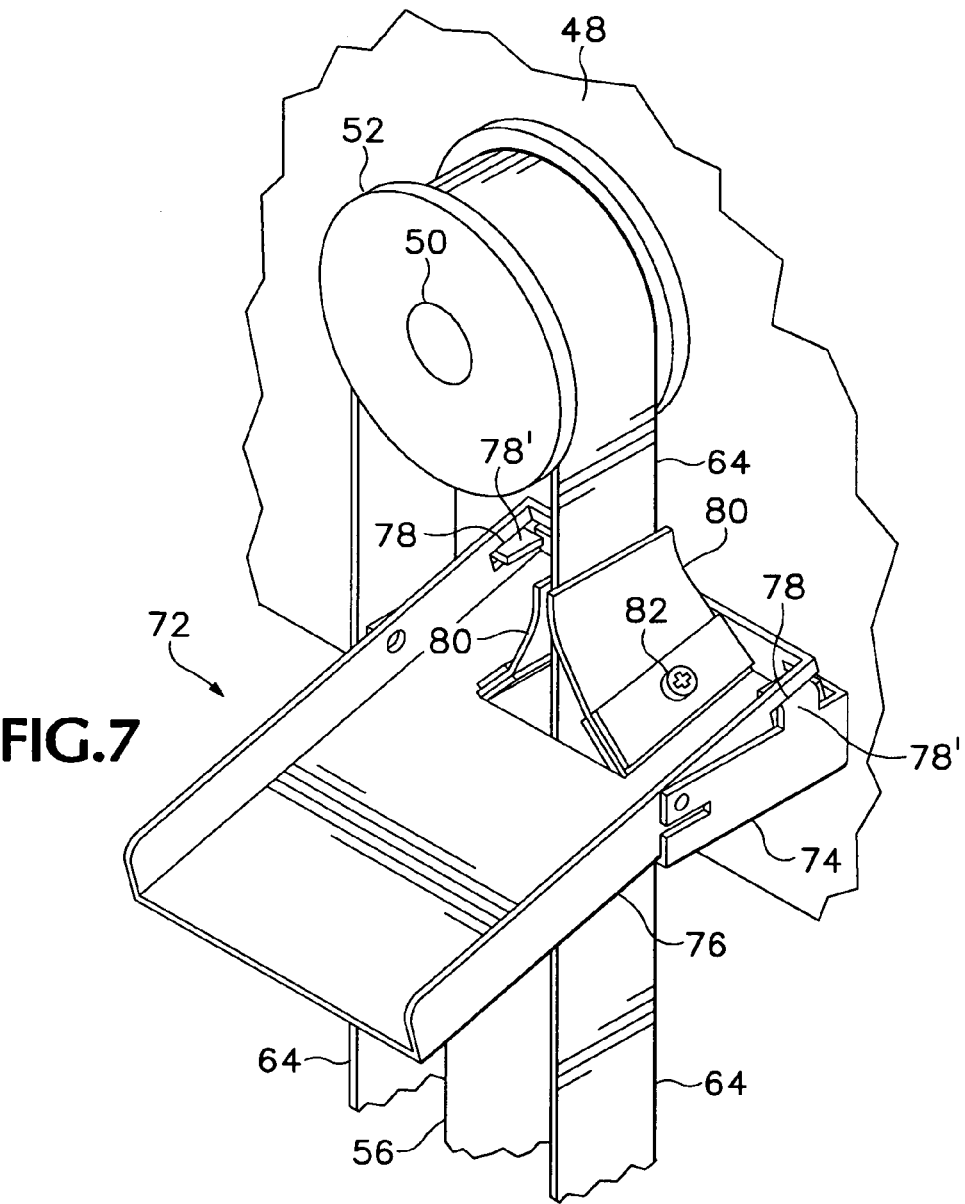

TOWER-TYPE GREASE REMOVAL APPARATUS FOR COMMERCIAL GREASE TRAP ASSEMBLIES

This application claims benefit under 35 U.S.C. 119(e) of the priority filing of U.S. Provisional application Ser. No. 60/617,812, filed 12 Oct. 2004.

BACKGROUND OF THE INVENTION

This invention relates to grease trap assemblies provided in waste water drain line systems, and more particularly to such grease trap assemblies having automatic, powered skimmer arrangements for skimming and removing grease and oils from the wastewater passing through the grease trap assembly prior to exiting through an outlet into the municiple sewer system serving the facility. Such grease trap assemblies are used in connection with commercial food preparation sinks, rinse sinks and dishwashing and utensil washing facilities and such in restaurants, fast food outlets, hospitals, hotels and other large kitchen facilities that produce grease and oil-laden wastewater in order to reduce the amount of grease, cooking oil and other contaminants that are introduced into the municipal sewer system and treatment facilities serving the area.

These grease trap assemblies are well known in the industry and range in complexity from structurally simple units that require periodic manual skimming by facility personnel to rather complex structural arrangements that provide for automatic skimming and pump discharge of skimmed grease and oil into external containers positioned adjacent the side wall of the trap assembly. The simple forms of traps in essence simply provide an enclosed, hollow box or settling tank structure having a kitchen wastewater inlet at one end and an outlet at the opposite end for connection to a sewer line, baffle plates typically being arranged within the cavity to interrupt direct flow-through of wastewater between the inlet and outlet, and defining a separation area between the baffles in which grease and oil may naturally float to the surface of the wastewater contained within the box. Periodically as needed, an employee must remove the top cover of the box and manually skim the grease and oil that has accumulated at the surface of the wastewater. This is an extremely unpleasant and time consuming task, made worse as is well known by the pungent and foul odors that are inherent in the skimmed materials.

Grease trap assemblies having automatic skimmer arrangements contained within the trap box have also been provided heretofore, and typically utilize rotating skimmer discs connected to an external drive means arranged to cause continuous rotation of the discs within the trap housing. The discs are cleaned by wiper blades arranged to direct grease and oil to a pump arrangement for pump discharge or by gravity flow into a holding container disposed alongside or vertically below the trap apparatus, such, as taught by U.S. Pat. Nos. 5,133,881, 4,268,396 and 4,051,024. These power skimmer arrangements all provide structurally complex rotating disc-type mechanical assemblies contained substantially entirely within the body housing of the grease traps and therefore are arranged, and structurally capable only of discharging skimmed grease and oils to the side of the grease trap tank adjacent to and alongside the external periphery of the tank. This requires additional floor space in the kitchen facility beyond that required by the grease trap tank itself, and completely prevents installation of these types of assemblies in in-floor situations. Moreover, because the skimming disc apparatus and related mechanical and often electrical structure of the grease skimming and removal apparatus of these patent teachings are contained and mounted within the hollow confines of the wastewater holding tank of the grease trap assemblies, routine and periodic inspection and maintenance of the assemblies requires access into the tank which is designed to maintain a predetermined level of grease-laden wastewater therein, making such operations extremely unpleasant and difficult to perform. Also the mechanical structures, since they occupy space within the interior confines of the grease trap tanks, obstruct inspection of the bottom of the tank for identifying and cleaning of the bottom of the tank of accumulated solids, etc. that invariably settle and build up over time. Further, since the mechanical and electrical components of the skimmer apparatus are contained in either submerged or close proximity to the water retained in the grease trap tank, these parts must be provided in a more expensive form capable of withstanding the hot and humid environment in which they must operate.

The present invention provides a skimming apparatus which is well adapted for inclusion in original manufacture of a complete grease trap assembly, but the invention is also particulary well adapted for retrofitting and upgrading existing, already installed and in use manual skimming trap assemblies into automatic skimmer condition as will become readily apparent. No other automatic grease removal skimmer apparatus has been provided heretofore that is arranged for and structurally capable of reasonably retrofitting existing, already installed grease trap assemblies, and it has been discovered that there is a great need and desire in the marketplace for such an apparatus.

SUMMARY OF THE INVENTION

In its basic concept this invention provides a grease skimming and removal apparatus contained substantially in a self-contained vertically extending tower assembly mounted on the top wall of a grease trap settling tank assembly, the tower providing for power driven belt skimming of wastewater contained in the tank and vertical carrying of skimmed grease and oils to an elevated position within the confines of the tower disposed vertically above the top of the grease trap settling tank for subsequent gravity discharge into a holding container supported on the tower vertically above the grease trap settling tank.

It is by virtue of the foregoing basic concept that the principal objective of this invention is achieved; namely the provision of a substantially self-contained grease trap skimming and grease removal apparatus that overcomes the structural complexities, limitations and disadvantages of grease trap grease removal systems of the prior art.

Another object and advantage of this invention is the provision of a skimming and grease removal apparatus of the class described which may be provided in the form of a complete skimming-type grease trap apparatus for purchase and installation in a facility as a complete assembly.

Another object and advantage of this invention is the provision of a skimming and grease removal apparatus of the class described which may be provided as a skimming and grease removal apparatus for retrofit installation onto existing and already-installed grease trap tank assemblies with minimal modification thereto.

Another object and advantage of this invention is the provision of a skimming and grease removal apparatus of the class described wherein the grease removal and collection apparatus requires no additional floor space than that already occupied by the grease trap apparatus itself, and also accommodates in-floor grease trap installations in commercial facilities.

Another object and advantage of this invention is the provision of a skimming and grease removal apparatus of the class described in which the drive motor and electrical apparatus are contained entirely outside of and remote from the interior, water-containing grease trap tank apparatus, thereby substantially eliminating possibility of electrical shock or shorting and expenses relating to the provision of sealed such units required for operation in close proximity to water and humid enclosures such as is present within grease trap tank enclosures.

A further object and advantage of this invention is the provision of a skimming and grease removal apparatus of the class described which completely avoids the structural need for grease discharge pumps and related structural complexity and expense.

A still further object and advantage of this invention is the provision of a skimming and grease removal apparatus of the class described which is arranged to provide for grease removal and collection with substantially no escape of odors emanating from the confines of the grease trap tank, the tower and the collection vessel between collection vessel-emptying and maintenance operations.

Still another object and advantage of this invention is the provision of a skimming and grease removal apparatus of the class described which is of simplified construction for economical manufacture and installation and facility of operation and maintenance.

The foregoing and other objects and advantages of the present invention will appear from the following detailed description, taken in connection with the accompanying drawings of a preferred embodiment.

BRIEF DESCRIPTION OF THE DRAWINGS

FIG. 2 is a fragmentary side elevation of the tower-type grease skimming and removal apparatus as viewed along the line 2-2 in FIG. 1.

FIG. 3 is a fragmentary side elevation, similar to FIG. 2 but illustrating the collection vessel assembly in condition removed from its releasable mount on the tower housing for emptying of the container vessel.

FIG. 5 is a fragmentary, sectional side elevation of the apparatus taken along the line 5-5 in FIG. 1.

FIG. 6 is a fragmentary side elevation of a second embodiment of the second, lower, submerged pulley of the invention and showing the provision of a circulation propeller arranged to induce current flow surrounding the submerged pulley and skimmer belt to draw floating grease and oils to the proximity of the belt for enhanced skimming operation.

FIG. 7 is a fragmentary, front perspective view, on an enlarged scale, of a preferred belt wiper and grease discharge arrangement of this invention.

FIG. 8 is a fragmentary side elevation, partially in section, illustrating an alternative embodiment of this invention providing the grease trap tank top wall and tower body housing member as a substantially unitary assembly.

DESCRIPTION OF THE PREFERRED EMBODIMENT

Figure 1:
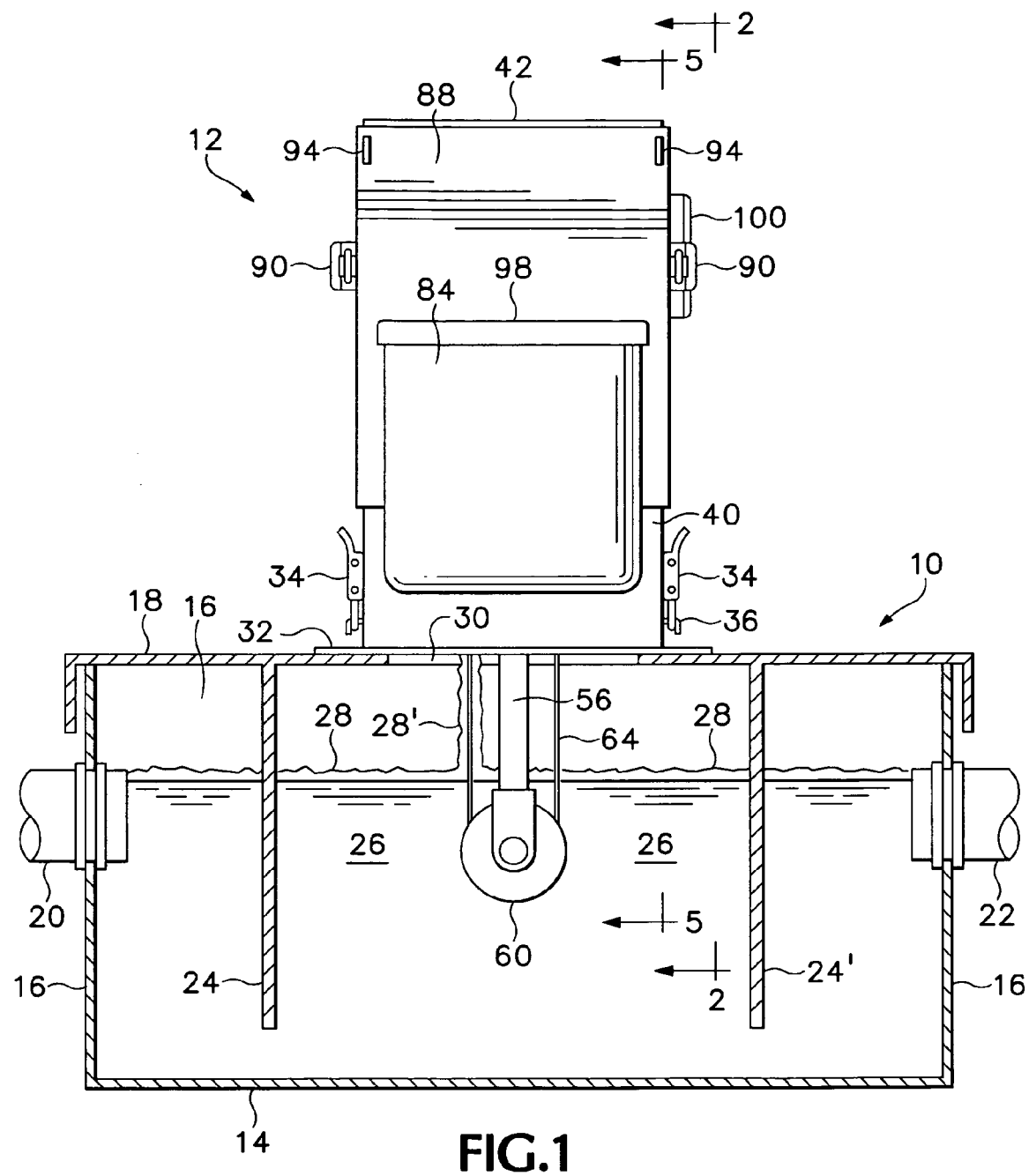
FIG. 1 is a side elevation, partially in sectional view, of a grease trap apparatus mounting a tower-type grease skimming and removal apparatus embodying features of the present invention.

FIG. 1 illustrates a basic grease trap assembly generally indicated at 10 mounting a tower-type skimmer and grease removal apparatus 12 embodying features of the present invention. For purposes of illustration herein, the embodiment of the invention illustrated in FIGS. 1-7 is shown in a form arranged for retrofit or subsequent installation onto an already-installed, basic grease trap settling tank assembly 10 in order to upgrade the assembly into automatic skimming capability. It is to be understood however that the grease trap settling tank assembly 10 and tower-type grease skimming and removal apparatus may also be provided together as a complete trap apparatus assembly as well. In either case, the basic grease trap tank assembly typically comprises, as shown, a substantially hollow box member or settling tank formed of a bottom wall 14, upstanding side and opposite end walls 16 and a top wall shown herein as a removable top lid member 18 arranged for releasable securement in position enclosing the interior confines of the trap box.

A wastewater inlet pipe 20 communicates the interior of the grease trap assembly with the waste water drain of one or more sinks (not shown) or dishwasher (not shown) of a facility, and an outlet pipe 22 communicates the interior of the trap assembly with the sewer system (not shown) servicing the facility. Baffle members 24, 24' are typically provided to obstruct and prevent direct flow of wastewater through the box from inlet 20 to outlet 22 and provide a reduced turbulence, separation or settling area 26 therebetween for greases and oils 28 mixed with the wastewater entering the interior cavity of the trap assembly to naturally separate and float to the top surface of the wastewater level maintained in the separation area 26. The baffle 24' also prevents passage of the separated, floating grease and oil 26 through the outlet 22 and into the sewer system, as is well understood by those skilled in the art.

Figure 4:
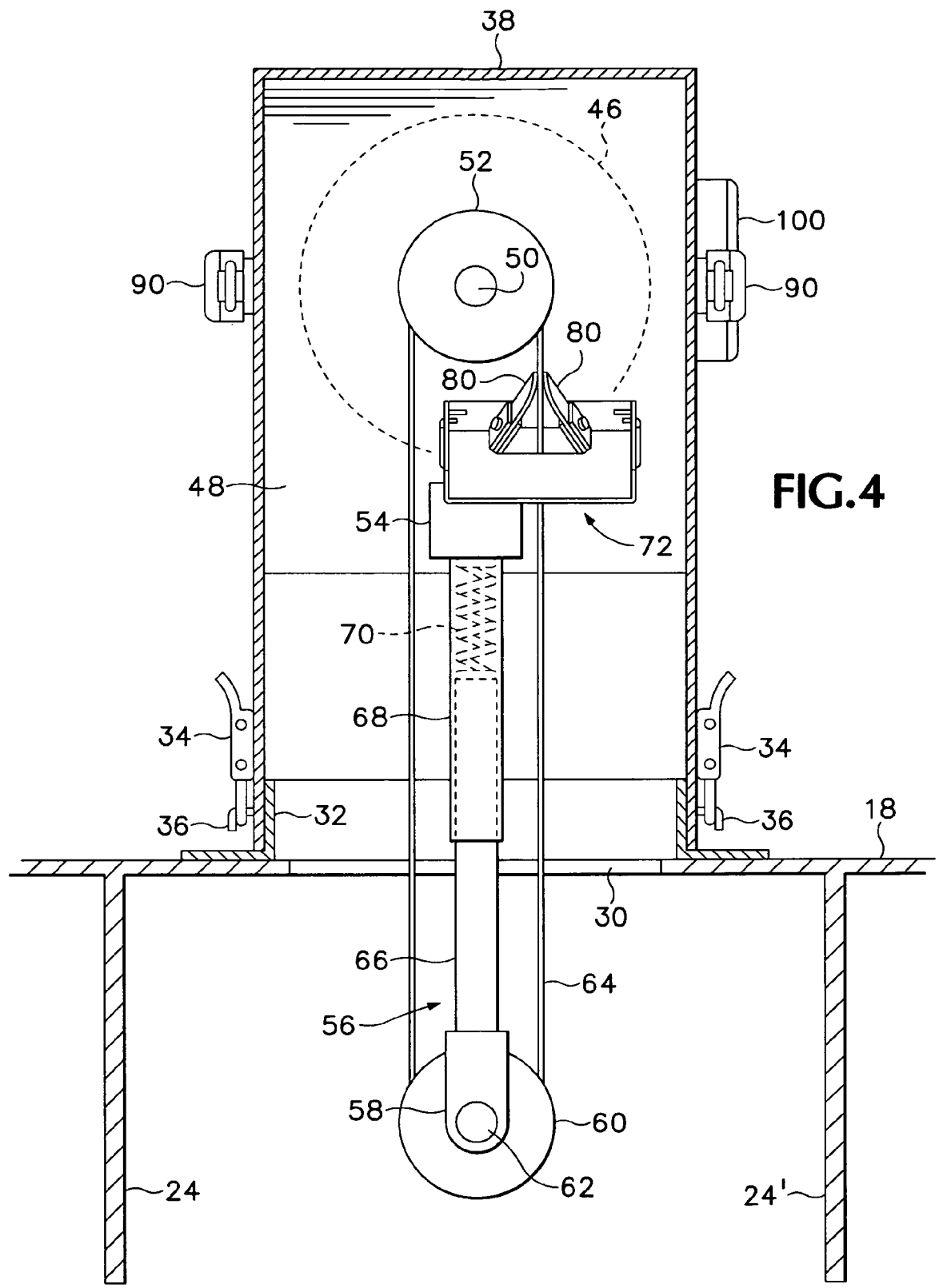
FIG. 4 is a fragmentary, sectional front elevation of the grease skimmer apparatus as viewed along the line 4-4 in FIG. 3.

As seen best in FIGS. 1, 4 and 5, the top lid member 18 includes, or in the case of retrofitting an existing trap assembly is provided with, an opening 30 therethrough positioned vertically above the separation area 26 provided for the confinement of floating grease and oils 28 as described previously. The tower-type skimmer apparatus 12 of this invention is mounted to the top lid member 18 in position overlying and extending vertically upwardly from the opening 30 as seen clearly in FIG. 1 of the drawings.

In the particular embodiment illustrated in FIG. 1, and as seen best in FIGS. 3, 4 and 5 of the drawings, a mounting flange member 32 is secured fixedly to the lid member 18 by any suitable securing means such as by screws, bolts, weld or bonding. The flange member is configured to effectively encircle the opening 30 and provide a secure, fixed mounting base for receiving and securing the tower assembly 12, yet to be described in detail, in upstanding position on the grease trap assembly extending vertically from the top wall or lid thereof.

In the particular embodiment illustrated herein, releasable latch-type lock members 34 mounted on the tower assembly 12 are provided to releasably engage corresponding catches 36 secured on the mounting flange member 32 to positively but releasably secure the tower assembly in upstanding, mounted condition on the top of the trap assembly 10. This mounting arrangement also allows for simple and convenient removal of the tower skimmer apparatus if desired for inspection, maintenance and repair without requiring entry into or disassembly of the grease trap assembly 10 itself, as in the case of prior art automated grease removal assemblies.

Turning now more specifically to the tower skimmer apparatus of this invention, as clearly seen in viewing FIGS. 1 and 2, a vertically elongated, vertically extending tower body housing member 38 forms a substantially hollow, upstanding body housing enclosure having side walls 40, a closed top end wall 42 and an open bottom end 44 arranged for registry with the mounting flange 32 and the opening 30 provided on the top lid member of the grease trap assembly 10 previously described. Thus it can be seen that the interior confines of the upstanding hollow tower housing enclosure is in substantially direct communication with the separation area 26 within the interior confines of the grease trap tank apparatus 10.

The upstanding tower body housing 38 mounts within its interior a drive motor 46 (seen best in FIG. 5 and shown schematically in broken lines in FIG. 4), which may, as shown in FIG. 5, be supported within the interior cavity of the tower by mounting members 48 arranged to enclose and separate the motor and other electronics of the apparatus from the interior areas of the tower that are exposed to the wastewater, grease and oils, heat, humidity and other injurious elements present within the confines of grease traps as will be evident.

As illustrated, the drive shaft 50 of motor 46 mounts a first, upper pulley member 52 for rotation with the drive shaft of the motor. A mount 54 within the housing is arranged to receive and support one end of a downwardly extending pulley support structure 56 arranged to extend downwardly through the open bottom end 44 of the tower housing. When the tower is installed on the top of a grease trap tank, the support 56 extends through the opening 30 in the top lid member of the trap assembly and terminates a predetermined spaced distance below the lid member in an opposite end mounting an axle bracket 58. The axle bracket rotatably mounts a second, lower submerged pulley 60 by an axle member 62. As is apparent in viewing FIG. 1, said predetermined spaced distance that the pulley support member extends below the bottom open end 44 of the tower assembly is selected and arranged to position the second, lower pulley 60 in a submerged condition beneath the surface of the wastewater contained within the grease trap tank assembly.

As is readily apparent from the drawings, the opposite, first and second pulleys 52, 60 are configured to receive, support and rotate an endless grease skimmer belt member 64 formed as a continuous, vertically elongated, vertically extending closed loop when the drive motor 46 is operating. Preferably, as shown best in FIG. 4, tension means is provided for maintaining the belt member 64 in a tensioned condition on the opposite pulleys 52, 60 in order to assure proper and continuous driving interengagement between the pulleys and the skimmer belt member.

In the particular embodiment shown therein, and seen best in FIG. 4, tension means is provided by forming the pulley support member 56 as a telescopically extensible assembly comprising an inner leg member 66 slidingly carried within the hollow confines of an outer tube member 68, a tension spring 70 interengaging the inner and outer members, 66, 68 to continuously urge the inner leg member 66 in its extension direction, thereby maintaining the belt 64 in a tensioned condition on the opposite pulleys. It is to be understood that in the particular embodiment of the invention illustrated herein, the apparatus is arranged herein to provide a clockwise direction of rotation of the pulleys and belt 64 carried thereon as viewed in FIG. 4.

Referring to the skimmer belt 64, although it can be formed of a variety of various flexible materials such as selected synthetic thermoplatic resins, plastic, vinyl, rubber, metals and even selected fabric materials, it has been found that a preferred skimmer belt construction is formed as an endless belt or strap of selected flexible polyurethane material having a belt width of approximately one inch. This particular belt material is preferred for its strength, durability, resistance to wear and corrosion, flexibility, ability to be tensioned without stretching, its surface for effective cleaning contact by wiper blades, and because grease and oils have a strong affinity for attaching to the surface of this material, making for effective skimming operation as will become clear. Another preferred belt material is stainless steel. It is to be understood that in larger size trap assemblies with higher volume skimming requirements, the width of the belt may be increased as needed or desired, and accordingly large scale arrangements may utilize belts having a width of five to six inches or more.

As also seen best in FIGS. 4, 5 and 7, a belt cleaning and grease discharge chute assembly 72 is supported in a vertically elevated, downwardly angularly tilted position in the tower apparatus and arranged for cleaning the belt of clinging grease and oil 28' collected from the surface of the waste water in the grease trap during rotation of the belt during operation of the invention. In this regard, the chute assembly illustrated includes a support base 74 fixedly mounted in the interior of the tower body housing adjacent the upper pulley member 52 and arranged for passage of a course of the belt loop therethrough as evident in FIG. 7. A discharge chute member 76 is preferably removably secured to and supported by the support base member 74, as by releasably interengaging slot 78 and tab 78' arrangement shown, the chute disposed thereon in an angularly downwardly tilted condition. The discharge chute 76 is, as shown, arranged with wiper blade mounts positioned on opposite sides of the belt passing therebetween and, in the embodiment shown, through corresponding openings through the support base 74 and chute 76. As seen, each of the wiper blade mounts illustrated herein comprises a blade support member arranged to retain and support a corresponding wiper blade member 80 secured thereto, as by screws 82, each blade member supported in a angularly upstanding condition with its upper, wiper edge maintained in frictional, wiping engagement with the corresponding side surface of the belt 64 as clearly seen in FIGS. 4 and 7. The wiper blades are preferably formed of a selected synthetic thermoplastic resin, although they may alternatively be formed of metal, rubber and other suitable materials as well.

The downwardly angled discharge chute 76 communicating with the wiper blades 80 is arranged to, with the help of gravity, carry and direct grease and oil downwardly from the wiper blades and along the chute to the exterior of the tower housing assembly for discharge into an external collection vessel 84 removably supported on the tower. Preferably the discharge chute 76 and collection vessel 84 are supported by the tower body housing for disposition of the collection vessel on, or supported in a position vertically over the top lid member 18 of the underlying trap assembly 10 so that the only floor space that is required of the entire apparatus is the floor space occupied by the grease trap tank assembly 10 itself.

In a preferred form, and as seen best in FIGS. 1-3 and 5, the collection vessel is mounted, as by odor-sealing mounting member 86 to a removable tower housing access door member 88 which, when removed, allows facilitated access to the interior confines of the tower for periodic inspection and maintenance and replacement of the belt, wiper blades, pulleys and parts contained therein. As shown, the door member may be releasably secured on the tower by latch-type lock members 90 on the tower releasably engaging corresponding catches 92 similar to those described earlier in connection with lock members 34, 36. Obviously, other suitable forms of releasable lock means may be provided as an alternative if desired.

The quick release type of lock member such as those shown is preferred however to facilitate easy removal of the door panel from the tower when the discharge container is being supported by the door panel, as shown, in order to expedite the separation and replacement of the container on the tower assembly when the container needs to be emptied. Interengaging support hooks 94 on the tower may be provided to cooperate with corresponding openings 96 on the door panel for removably supporting the weight of the door panel and container as will be readily apparent.

A removable container lid member 98 is provided to releasably close the interior of the container to prevent spillage and the escape of odors, and to facilitate emptying of the container as is also readily apparent. Thus mounted on the assembly, the interconnected interior confines of the collection vessel, the tower, and the grease trap tank assembly are substantially sealed from the exterior environment, thereby preventing the escape of odors from the interior confines of the grease trap apparatus, tower and collection vessel to the surrounding environment.

With the motor 46 connected to a source of power (not shown) and operating, the skimmer belt member 64 is revolved by its support on the first, upper, drive pulley 52 and the submerged second, lower pulley 60 in a clockwise direction of rotational movement (in this particular embodiment as viewed best in FIGS. 1, 4 and 7). As is evident in viewing FIG. 1, the rotating belt member collects or skims grease and oil 28' from the surface of the waste water contained in the collection area 26 of the grease trap and carries the skimmed grease and oils clinging to the belt vertically upward out of the interior confines of the grease trap tank and into the confines of the tower and over the upper drive pulley 52. The wiper blades 80 frictionally engage the opposite side surfaces of the belt member 64 as shown, and effectively wipe the respective surfaces of the moving belt clean of grease and oils, and direct the grease and oils downwardly along the wiper blades to the elevated receiving end of the downwardly sloping discharge chute 76, whereupon the grease and oil flows, assisted by the influence of gravity, down the inclined chute and out of its vertically lower discharge end and into the interior confines of the container where the skimmed grease and oil is allowed to collect. Periodically as needed, the container assembly is simply removed and the contents discarded according to normal procedures.

The operation of the motor may be manually activated, as by a simple on/off power switch (not shown). Alternatively a motor controller 100, such as a timer, may be provided to automatically and selectively operate the motor on a timed schedule or cycle that may be set as needed for the particular kitchen situation as is determined by a user.

FIG. 6 illustrates that the second, lower, submerged pulley assembly previously described may if desired also include an elongated axle member 62' arranged for rotation with the belt pulley 60, the elongated axle member adapted to mount an impeller member or propeller 102 configured to create a gentle, underwater drawing current when the skimmer belt is rotating to draw floating grease and oil toward the area of the vertically upward moving skimmer belt member and into contact therewith. Other means for inducing such current flow may of course be alternatively provided as desired or needed for the purpose.

Further, as those skilled in grease trap apparatus are aware, it may be desirable or necessary that the water temperature in the trap may need to be raised in order to assure against congealing of the grease on the top surface of the water, as may occur in cases of low output of wastewater and use of lower temperature water in facility sinks, etc. In this regard, the tower housing may also include a heating element (not shown) arranged to extend downwardly through the opening and into the wastewater held within the trap. The heating element would be controlled for operation in accordance with the operation of the skimmer belt assembly and arranged to heat the wastewater to a temperature of approximately 110° F.-120° F. for maintaining greases and oils in a liquid state and for efficient skimming operation of the belt, as will be apparent to those skilled in the art.

Finally, FIG. 8 illustrates that the tower type skimmer apparatus of this invention may alternatively be provided as an integral element of the top wall or top lid member 104 of a grease trap tank apparatus 10, or provided as the lid member of a complete, original manufacture of a tower type skimmer grease trap apparatus. Alternatively, in the case of a retrofit upgrade of an already existing grease trap apparatus, this arrangement may be employed to provide an alternative to the requirement of providing an opening 30 through the existing lid member of the grease trap.

From the foregoing it will be apparent to those skilled in the art that many changes other than those already described may be made in the size, shape, type, number and arrangement of parts described hereinbefore without departing from the spirit of this invention and the scope of the appended claims.

Having thus described my invention and the manner in which it may be used, installed and operated, I claim:

1. For use with a grease trap assembly of the type forming a substantially hollow wastewater settling tank enclosure having a top wall and an opening through said top wall, a tower-type grease skimming and removal apparatus comprising:
   a) a substantially hollow vertically extending tower body housing enclosure having a bottom base portion arranged for substantially sealed, mounted securement on the top wall of a grease trap settling tank assembly for vertical extension of the tower housing therefrom in position overlying and encirclingly enclosing the opening through the top wall of the grease trap tank for communication of the interior confines of the tower body housing enclosure with the interior confines of the hollow grease trap tank enclosure through said opening,
   b) a first, upper belt pulley member mounted in the interior of the tower body housing adjacent the vertically upward end portion thereof,
   c) a second, lower belt pulley member mounted in position extended beneath the bottom base portion of the tower body housing and supported at a predetermined distance beneath said bottom base portion selected for submerged disposition of the pulley member in wastewater contained in the grease trap tank assembly when the tower body housing is in mounted securement thereon,
   d) an elongated grease skimming belt member supported on said upper and lower pulley members and forming an endless, rotating, vertically elongated, vertically extending belt loop therebetween, e) powered belt drive apparatus arranged to engage said skimming belt member and drive the belt loop member in rotational motion supported by said upper and lower pulley members, f) at least one wiper member supported in the tower body housing adjacent said upper pulley member and arranged to wipingly engage the moving skimming belt member to remove grease and oils carried on the surface of the moving belt, g) an elongated, angularly tilted discharge chute member having a first, vertically elevated receiving end portion supported within the interior confines of the tower housing and a second, vertically lower discharge end communicating with the outside of said tower body housing vertically above said bottom base edge thereof, said first, receiving end communicating with said at least one wiper member to receive grease and oils wiped from the belt and direct the received grease and oils by gravity down the angularly tilted chute member to its second, discharge end for discharge of the directed grease and oils out of the tower body housing, and h) a substantially hollow, enclosed collection vessel releasably mounted on the exterior of said tower body housing above the bottom base portion thereof, said collection vessel arranged for communication of its interior confines with said discharge end of the discharge chute member for receiving and collecting grease and oils discharged by gravity from said discharge end of the chute member, said collection vessel being supported on said tower body housing for substantially sealed communication of the interior confines of the collection vessel with the interior confines of the tower body housing, whereby to substantially prevent the escape of odors from the interior confines of the collection vessel and tower body housing and a grease trap apparatus mounting the tower body housing.

2. The grease skimming and removal apparatus of claim 1 including control means for periodically activating and deactivating operation of said powered belt drive apparatus at predetermined intervals and for predetermined duration as determined by an operator.

3. The grease skimming and removal apparatus of claim 1 including a wastewater circulation member adjacent said second, lower pulley member and arranged to draw wastewater contained in the grease trap apparatus toward the belt member moving on the submerged lower pulley member when the grease removal apparatus is in mounted securement on a grease trap tank apparatus.

4. A grease trap apparatus for removing grease and oils from wastewater passing therethrough, the grease trap apparatus comprising:

a) a substantially hollow settling tank member having enclosing bottom and side walls and a wastewater inlet and outlet for connection to the drain line of a facility, the settling tank for maintaining within its interior confines a predetermined volume of wastewater passing through the tank member from inlet to outlet, b) a tank-covering top wall member on the tank member and enclosing the interior confines of the settling tank member, the top wall member arranged with an opening therethrough, c) a substantially hollow, vertically extending tower body housing member on said top wall member overlying and encircling said opening for communication of the interior confines of said hollow tower housing with the interior confines of the hollow settling tank through said opening in said top wall, the tower body housing extending vertically upward from the top wall of the settling tank, d) a first, upper belt pulley member mounted in the interior of the tower body housing adjacent the vertically elevated upper end thereof, and a second, lower belt pulley member mounted for disposition in the interior of the settling tank beneath said opening and in submerged condition in said predetermined volume of wastewater maintained in said settling tank, e) an elongated grease skimming belt member supported on said upper and lower pulley members and forming an endless, vertically elongated, vertically extending belt loop therebetween, f) powered belt drive apparatus arranged to engage said skimming belt member and drive the belt loop member in rotational motion supported on said upper and lower pulley members, g) at least one wiper member supported in the tower body housing adjacent said upper pulley member and arranged to wipingly engage the moving skimming belt member to remove grease and oils carried on the surface of the moving belt, h) an elongated, angularly tilted discharge chute member having a first, vertically elevated receiving end portion supported within the interior confines of the tower housing, and a second, vertically lower discharge end communicating with the outside of said tower body housing vertically above said top wall of the settling tank, said first, receiving end communicating with said at least one wiper member to receive grease and oils wiped from the belt and direct the received grease and oils by gravity down the angularly tilted chute member to said second, discharge end of the chute member for discharge of grease and oils outside of the tower body housing, and i) a substantially hollow, enclosed collection vessel releasably mounted on the exterior of said tower body housing above the bottom base portion thereof, said collection vessel arranged for communication of its interior confines with said discharge end of the discharge chute member for receiving and collecting grease and oils discharged by gravity from said discharge end of the chute member, said collection vessel being supported on said tower body housing for substantially sealed communication of the interior confines of the collection vessel with the interior confines of the tower body housing, whereby to substantially prevent the escape of odors from the interior confines of the collection vessel and tower body housing and a grease trap apparatus mounting the tower body housing.

* * * * *